May 29, 1945. J. H. WIGGINS 2,377,288
GAUGING APPARATUS FOR LIQUID STORAGE TANKS
Filed Jan. 27, 1944
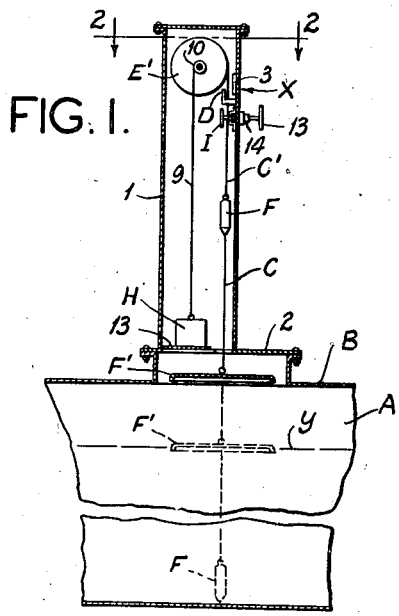
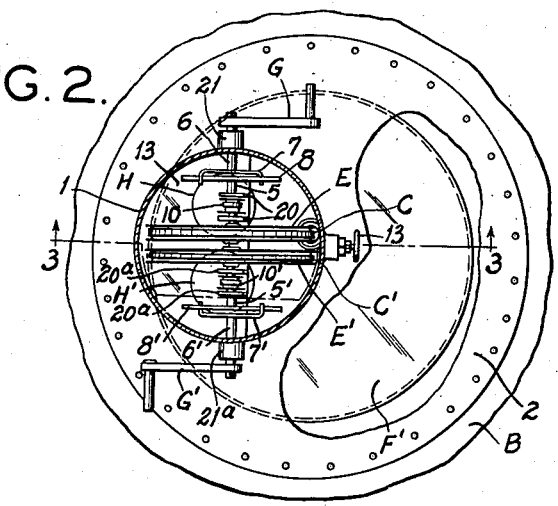
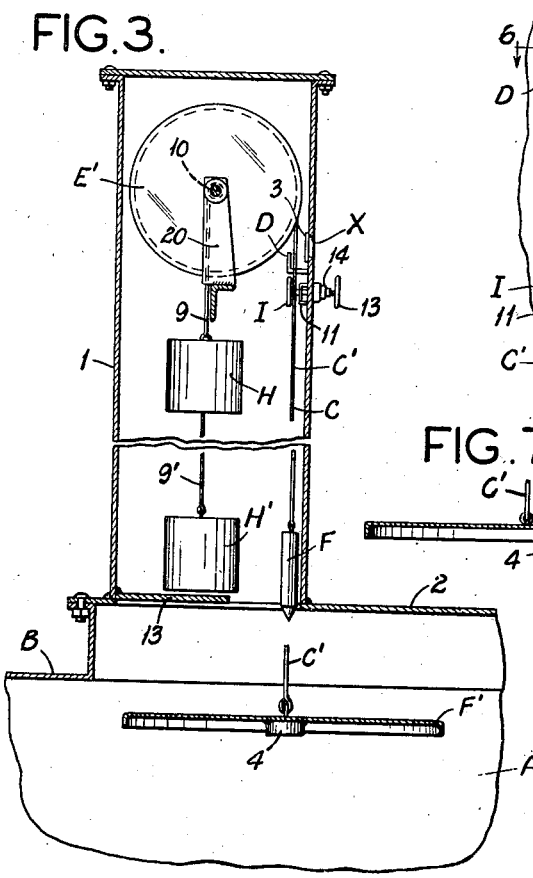
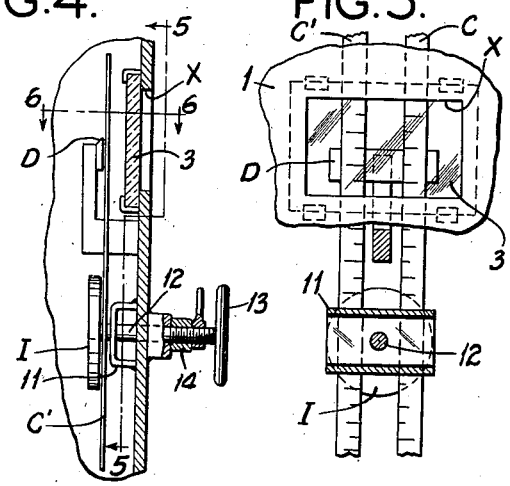
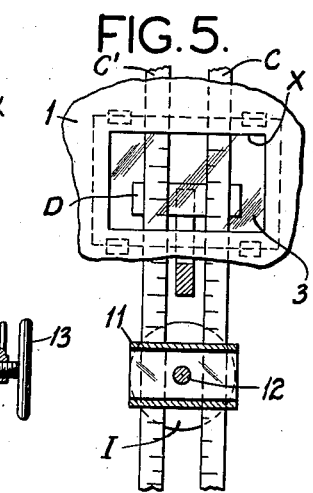
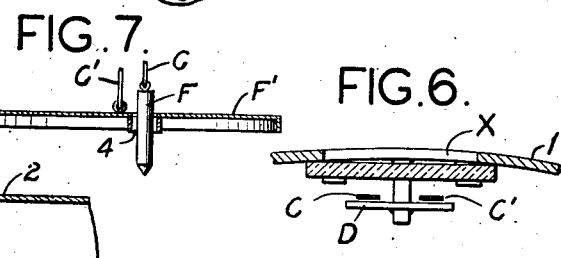
INVENTOR:
JOHN H. WIGGINS
BY Wells L. Church
ATTORNEY Patented May 29, 1945

2,377,288

UNITED STATES PATENT OFFICE 2,377,288

GAUGING APPARATUS FOR LIQUID STORAGE TANKS

John H. Wiggins, Chicago, Ill.

Application January 27, 1944, Serial No. 519,958

10 Claims. (Cl. 73—321)

This invention relates to tank gauging apparatus and procedure of the particular type or kind that contemplate ascertaining the quantity of liquid in a tank by measuring the distance between the bottom of the tank and a datum point, measuring the distance between said datum point and the surface of the liquid, and then subtracting the number representing the second measurement from the number representing the first measurement, so as to obtain a number which represents the depth of the body of liquid stored in the tank.

In prior tank gauging apparatus which operate on the principle above referred to, the two measurements were obtained by separate and distinct operations, performed one after the other, and the accuracy of the apparatus was dependent upon the fact that no change occurred in the position of the datum point between the time the first measurement was made and the time the second measurement was made. In instances where the tank was provided with an immovable roof, such as a rigid roof, the datum point was usually mounted on the roof or on a part attached to the roof, and in instances where the tank was provided with a movable or flexible roof, such as a breather type roof, the datum point was usually mounted on a stationary member, such as a part carried by or attached to the side wall of the tank. However, many gauging engineers contend that all tank roofs have some movement, and that even in a so-called rigid roof, such as a coned roof, or a domed roof, the roof plates buckle or shift, due to temperature changes, or due to the shifting weight of a man standing on the roof during the gauging procedure. Accordingly, if the datum point of the gauging apparatus is mounted on the roof, there is liable to be a change in the position of the datum point in the interval between the two measurements made during the gauging procedure, and if this should occur, the number obtained by subtracting one measurement from the other does not represent the true depth of the liquid in the tank. This fact is so well recognized in the oil industry, that many buyers of oil insist upon having the oil in a tank measured by a so-called innage gauge, which involves positioning a calibrated tape in the liquid in the tank, so that a plumb bob at the lower end of the tape is in just touching contact with the bottom of the tank, and then determining the depth of the liquid from the wetted portion of the tape, or by means of a float on the surface of the liquid that automatically grips the tape and remains fixed thereon at a point representing the surface of the liquid, when the tape is withdrawn from the liquid. However, an innage gauge is open to the objection that it is dependent for its accuracy on the skill or sense of touch of the gauger in setting the tape, so that it is taut, and the plumb bob is in just touching contact with the bottom of the tank; it is affected by surging of the liquid or ripples on the surface of the liquid; and it is restricted to use with liquids that are not highly volatile.

One object of my present invention is to increase the accuracy, or eliminate the possibility of error, in tank gauging apparatus of the type or kind that contemplate measuring the distance between a datum means and the bottom of the tank and measuring the distance between the datum means and the surface of the liquid, in calculating the depth of the liquid stored in the tank.

Another object is to increase the accuracy and improve the operation of gauging apparatus of the kind which are so constructed that it is not necessary for the gauger to have a high degree of skill or a delicate sense of touch, in order to obtain accurate setting of the plumb bob tape and the tape used to measure the distance between the datum means and the surface of the liquid.

Another object is to simplify tank gauging procedure by, in effect, combining two measuring operations into a single operation.

Another object is to provide a tank gauging apparatus, whose accuracy is not affected by movement of the roof of the tank, and which is of such construction or design that the datum means can be mounted on a breather type roof, balloon type roof, or other kind of vertically-movable roof, even though it is capable of a relatively great vertical movement upwardly and downwardly.

And still another object is to make it possible for a tank gauger to easily check a recorded item in a gauge record so as to see if it agrees with what the tapes actually indicated at the preceding gauge. Other objects and desirable features of my invention will be hereinafter pointed out.

To this end I have devised a tank gauging apparatus that comprises two tapes or equivalent measuring elements, arranged in such a position that both of said tapes can be read at the same instant, or by a single operation, one of said tapes being used to measure the distance between the bottom of the tank and a datum means, and the other tape being used to measure the distance between said datum means and the surface of the liquid in the tank. Due to the fact that the two tapes are read simultaneously, movement or tipping of the datum means has no effect on the accuracy of the apparatus, and hence, it is practicable to mount the datum means on the roof of the tank, even though said roof be of the type or kind which rises and falls in the normal use or operation of the tank. Also movement of the roof during the gauging operation has no effect on the accuracy of the apparatus, inasmuch as both tapes co-act with the same datum means, and both tapes are read at the same instant.

In order to produce a hand gauge that is easy to operate and whose accuracy is not dependent upon a high degree of skill on the part of the gauger, the tape operating mechanism is preferably of such construction that the gauger first initially sets the tapes by hand, and thereafter can permit a tape actuating means to come into operation to automatically set the tapes in absolutely correct reading position, said means being of such construction that it will effect correct setting of the tapes, even though the roof is moving during the gauging operation. Preferably, the apparatus is equipped with a means which the gauger can actuate manually, so as to clamp the tapes to the datum means or arrest the movement of the tapes relatively to the datum means, after the automatic tape setting means has functioned to set the tapes in correct reading position. Such a construction reduces error resulting from a hasty reading of the tapes, inasmuch as it enables the gauger to clamp the tapes to the datum means and then read the tapes at leisure; and still another desirable characteristic of such a structure is, that if the gauger leaves the tapes clamped to the datum means, at the completion of one gauging operation, they can be checked when the next gauge is made, so as to see whether they agree with the recorded reading which the gauger made in the gauge record at the time he previously read said tapes.

Figure 1 of the drawing is a vertical sectional view of a tank gauging apparatus embodying my present invention.

Figure 2 is an enlarged horizontal sectional view, taken on the line 2—2 of Figure 1.

Figure 3 is a vertical sectional view, taken on the line 3—3 of Figure 2.

Figure 4 is an enlarged vertical sectional view, for the purpose of illustrating the construction of the means used to clamp the tapes to the reading bar that constitutes the datum means.

Figure 5 is a view, taken on the line 5—5 of Figure 4.

Figure 6 is a horizontal sectional view, taken on the line 6—6 of Figure 4; and

Figure 7 is a sectional view of the surface tension disc, showing the opening in the same through which the plumb bob tape travels.

In the accompanying drawing which illustrates the preferred form of my invention, A designates a tank that is used for storing oil or other liquid, and B designates the roof of said tank which may be of any preferred type, such as a coned roof, domed roof, or other kind of rigid roof, or a breather roof, balloon roof, or other kind of movable roof. My improved gauging apparatus, which is herein illustrated as being mounted on the roof, comprises a vertically-disposed, gas-tight housing 1, mounted on a manhole cover 2 on the tank roof, two parallel tapes or equivalent calibrated, flexible measuring elements C and C' arranged vertically inside of the housing 1 in close proximity to each other, and a datum means or reading bar D inside of the housing 1, across which said tapes travel, the datum bar D being arranged horizontally in proximity to a sight opening $x$ in the front wall of the housing that is covered by a piece of glass or other suitable transparent material 3. The tapes C and C', which are used respectively to measure the distance between the bottom of the tank and the datum bar D, and the distance between said datum bar and the surface $y$ of the liquid in the tank, are attached at one end to independently-movable reels E and E', respectively, arranged in the upper portion of the housing 1, in parallel relation and in close proximity to each other. The tape C is attached at its lower end to a plumb bob F that holds said tape taut when the tape is in correct reading position, and the tape C' is attached at its lower end to an element F' that is adapted to assume a position at the surface of the liquid during the gauging operation. Preferably, the element F', to which the tape C' is attached, consists of a telltale or surface tension gauge of the general kind disclosed in my prior U. S. Patent No. 2,282,771, dated May 12, 1942, and my prior re-issue Patent No. 22,367, dated August 17, 1943. During the operation of measuring the distance between the datum bar and the surface of the liquid, the surface tension gauge F' functions as an anchoring device to hold the theoretical end of the tape C' at the surface of the liquid when the tape C' is set in correct reading position.

The tape C' is attached to the center of the surface tension gauge F', and in order that the two tapes may maintain their parallel relationship, an opening 4 is formed in the surface tension gauge F' at one side of the center of the same, as shown in Figure 7, so as to provide a passageway for the tape C, to which the plumb bob is attached.

The operating mechanism for the tapes preferably comprises a manually-operable means for initially setting or adjusting the tapes, and also a means which functions to automatically set the tapes in correct reading position, after the tapes have been manipulated to lower the plumb bob into the liquid in the tank, and to arrange the surface tension gauge at or near the surface of the liquid. In the apparatus illustrated in the drawing the reels E and E' are rigidly attached to the adjacent ends of independently movable shafts 5 and 5', respectively, that are arranged horizontally in longitudinal alignment with each other, in bearings 20 and 20a in the upper portion of the housing 1, as shown in Figure 2. The shafts 5 and 5' can be rotated manually independently of each other by crank arms or other suitable actuating devices G and G' that can be connected with or disconnected from said shafts 5 and 5' at the will of the gauger. Thus, as shown in Figure 2, the operating crank G is rigidly attached to the outer end of a shaft 6 arranged in longitudinal alignment with the shaft 5 and mounted in a bearing 21 on the housing 1. The shaft 6 is free to rotate in the bearing 21 and also shift longitudinally of said bearing, and at the inner end of the shaft 6 there is a clutch member 7 that is adapted to be engaged with a co-acting clutch member 8 rigidly attached to the shaft 5. By shifting the shaft 6 inwardly towards the reel E, the clutch member 7 on the shaft 6 will be engaged with the clutch member 8 on the shaft 5, so as to impart rotary movement to the reel E when the crank arm G is rotated, and by shifting said shaft 6 outwardly or in the opposite direction, the clutch members 7 and 8 are disengaged from each other, thus releasing the reel E from the manually-operable means for said reel, and permitting said reel to rotate under the influence of an automatically-operating setting mechanism, as hereinafter explained. The crank arm G' can be engaged with and disengaged from its co-acting reel shaft 5' by a similar mechanism comprising a longitudinally-shiftable shaft 6' mounted in a bearing 21ª on the housing 1, a clutch member 7' rigidly attached to the shaft 6', and a coacting clutch member 8' rigidly attached to the reel shaft 5'.

The means above referred to, that is used to turn the reels E and E' to automatically set the tapes in correct reading position, comprises a counterweight H suspended from a cable 9 that is attached to a spool or hub 10, rigidly fastened to the shaft 5, and a counterweight H' suspended from a cable 9' attached to a spool or hub 10' secured to the shaft 5'. Under certain conditions, as hereinafter explained, the counterweight H causes the tape C to be set in correct reading position and maintained under a predetermined tension, with the plumb bob F in just touching contact with the bottom of the tank, and the counterweight H' causes the tape C' to be set in correct reading position and maintained under a predetermined tension, with the surface tension gauge F' in contact with the surface of the liquid.

By arranging the reels E and E' in parallel relationship and in close proximity to each other, the tapes C and C' are disposed in such relationship that when the gauger glances at the sight opening x in the housing, he sees both tapes at the same instant, and hence, reads both tapes in a single operation. In order to guard against error, resulting from the gauger glancing at the tapes too hastily, the apparatus is equipped with a means that the gauger can actuate manually to simultaneously clamp both of the tapes and hold them at rest, or in stationary relationship with the reading bar D, after which the gauger can read said tapes at leisure. Said tape clamping or holding means is herein illustrated as consisting of a shiftable or movable clamping device I, arranged in opposed relationship with an abutment piece 11 on the inside of the housing located under the sight opening x in the housing, as shown in Figures 4 and 5. The tapes travel between the clamping device I and abutment piece 11, and said clamping device is provided with a shank 12 that projects forwardly through the wall of the housing, whereby the gauger, by grasping a knob 13 on the end of the shank 12, can move the device I towards the abutment piece 11, so as to instantly clamp both of the tapes C and C'. After said tape clamping device has been actuated to clamp the tapes, it can be locked in clamping position in various ways, as, for example, by means of a clamping nut 14, adjustably mounted on a screw-threaded portion of the shank 12, and adapted to be manipulated after said shank has been pulled forwardly, to lock it in its forward position.

To use the above described apparatus to gauge the liquid in the tank A, the gauger first couples the crank arm G with its co-acting shaft 5, and then rotates said crank arm in a direction to lower the plumb bob F to the bottom of the tank. Thereafter, said crank arm is shifted in a direction to disengage it from the shaft 5, whereupon the counterweight H comes into action to impose a load on the tape C in opposition to the downward force which the plumb bob exerts on said tape. If the plumb bob F weighs, say, 2 lbs., the counterweight H will be designed so as to give a net pull on the tape C of approximately 1 lb. This is sufficient to automatically set the tape C in correct reading position, as the load which the counterweight H exerts on the tape holds the tape taut under a predetermined tension, with the plumb bob in just touching contact with the bottom of the tank. The next step in the gauging procedure is to engage the crank arm G' with the shaft 5', and turn said crank arm in a direction to move the surface tension disc F' downwardly until said disc is submerged a few inches below the surface of the liquid in the tank. The crank arm G' is then disengaged from the shaft 5', whereupon the counterweight H' comes into action to exert a pull on the tape C', in opposition to the force exerted on said tape by the surface tension disc F'. If said disc F' weighs, say, 2 lbs., the counterweight H' will be so designed that it exerts a net pull of, say, 3 lbs. on the tape C'. This is sufficient to pull the disc F' upwardly through the liquid, and when said disc reaches the surface of the liquid, it automatically stops, due to surface tension or the picking up of extra liquid by the disc F', or by both actions, as explained in my patents previously mentioned. The pull which the counterweight H' exerts on the tape C' sets said tape in correct reading position, and maintains said tape under a predetermined tension with the surface tension disc F' at the end of the tape, in touching contact with the liquid. If desired, a check may be made to attest the fact that the surface tension disc is at the liquid surface, by breaking said disc away from the liquid surface, by using the manually-actuating device G' to exert an upward pull on the tape C', after which the surface tension disc can be again set at the surface of the liquid. A similar action may be applied to the plumb bob. These actions constitute hand checks on the initial setting of the devices at the ends of the tapes. Normally, or when the apparatus is not in use, the plumb bob assumes a position at the bottom of the tank, due to the fact that said plumb bob is of greater weight than the counterweight H, and the surface tension disc F' assumes a position in the manhole on the roof, as shown in full lines in Figure 1, due to the fact that the counterweight H' is of greater weight than the surface tension disc. At such times the counterweight H' rests upon a supporting device 13, which also performs the function of a stop to limit the upward movement of the surface tension disc, and prevent it from striking against the cover 2 of the manhole on the roof. Even if the roof B of the tank moves vertically, either upwardly or downwardly, during the procedure of setting the tapes, such movement of the roof has no effect on the accuracy of the apparatus, inasmuch as the datum point or reading bar D is carried by the roof, and hence, movement of the roof simply moves the datum point the same distance along both of the tapes.

After both of the tapes have been set in correct reading position, as above explained, and if the roof B is at rest, said tapes may be read without locking them by the clamping device I. To make sure, however, the gauger manipulates the clamping device I so as to clamp the tapes C and C' and hold them in fixed relationship with the reading bar D. Subsequently, the clamping device I may be locked in clamping position by manipulating the locking nut 14, or equivalent means associated with the clamping device I. Sometimes after a gauge is checked in the office of the owner of the tank, it is discovered that an error has been made in the gauge. If, in the meantime, there has been a movement of liquid into or out of the tank, there is no way to tell what the correct gauge may have been. My apparatus remedies this defect of gauging apparatus of conventional construction, for if the gauger leaves the tape clamping device I in its locked or active position, after making a gauge, the gauger can return any time and again examine the tapes to get the correct reading. Furthermore, my improved gauging apparatus gives a double check on what the gauger reads, say, the first day. For example, the gauger uses the apparatus, clamps the tapes and then reads the tapes and makes a written record of what the tapes indicate. The second day, the gauger comes to the tank to make another gauge. As a routine, he first reads and records the first gauge or preceding gauge, not knowing what it is. He can then compare it with the first day's reading, and if they do not agree, he can read the tapes again to make sure. Many errors are made in reading the tapes of tank gauging apparatus, and my invention tends to eliminate error inasmuch as I provide a means that clamps the tapes in fixed relationship with the reading bar at the time a gauge is made and which maintains the tapes and reading bar in this relationship until another gauge is made.

My apparatus not only has the desirable features and characteristics previously pointed out, but it also takes care of an unlimited movement of the tank roof, and is a practical design for tank roofs that move 10 ft. or 50 ft., or more, such as lifter roofs of the kind that are used extensively on oil tanks. For instance, whether the roof moves 3 ft., 4 ft., or even 10 ft., up and down, the only required difference in construction of my apparatus would be to add a few more feet to the measuring tapes C and C'.

While I prefer to use a surface tension gauge or tell-tale of the kind previously mentioned, at the lower end of the tape which is employed to measure the distance between the datum means and the surface of the liquid, I wish it to be understood that my broad idea contemplates the use of any suitable means for locating the lower end of said tape at the surface of the liquid during the gauging operation. It should also be understood that my broad idea contemplates the use of various kinds of means for manually and automatically adjusting the tapes during the gauging operation. The structure herein shown is of simple design and it is reliable in operation, inasmuch as the two tape reels are free to rotate, either in clockwise or counter-clockwise direction, when the operating cranks G and G' are inactive or disconnected from the tape reels. At such times the plumb bob tape reel E is under the influence of two opposing forces, to wit, the plumb bob F and the counterweight H, which are of such relative weights, that the tape C is held taut, under a predetermined tension, with the plumb bob in just touching contact with the bottom of the tank, and the other reel E' is under the influence of two opposing forces, to wit, the element F' and the counterweight H', which are of such design or relative weights, that the tape C' is held taut, under a predetermined tension, with the element F' disposed at the surface of the liquid. In such a structure the manually-operable actuating devices G and G' impose no load on the tape reels and have no influence on said reels, when the counterweights H and H' are performing their function. Accordingly, if the counterweights and the devices at the free ends of the tapes are properly designed or correlated, setting of the tapes in correct reading position is attained, without depending on a high degree of skill or care on the part of the gauger. All that the gauger has to do to gauge the liquid, is to couple the operating cranks G and G' with the tape reels and then manipulate them so as to arrange the devices F and G' in approximate position and then disengage said cranks from the reels, whereupon the tapes will automatically assume such a position that the gauger, by glancing through the sight opening X in the housing I, can ascertain at the same instant, the two numbers on said tapes, which are used in determining the depth of the liquid in the tank.

Having thus described my invention, what I claim as new and desire to secure by Letters Patent is:

1. A liquid storage tank provided with a roof, a datum means mounted on the roof in fixed relation with the same, and two calibrated measuring elements adapted to be disposed crosswise of said datum means and extending downwardly from the same to the top surface and to the bottom of the body of liquid stored in the tank, said measuring elements being arranged in parallel relation at the datum means and in such close proximity to each other that the user, by glancing at the datum means, can read both measuring elements by a single operation.

2. A liquid storage tank of the kind described in claim 1, equipped with a manually-operable means for clamping or holding said measuring elements in fixed relation with said datum means.

3. A liquid storage tank of the kind described in claim 1, equipped with a manually-operable means for initially setting said measuring elements, and an independent automatically-operating means for setting said measuring elements in correct reading position.

4. A liquid storage tank provided with a roof, two reels mounted on said roof, calibrated tapes attached to said reels and leading downwardly from the same into the tank, a datum means on the roof with which both of said tapes co-act, said tapes being arranged in close proximity to each other so that both of said tapes can be read at the same instant with relation to said datum means, and means for actuating said reels so as to set one tape in position to measure the distance between said datum means and the top surface of the body of liquid stored in the tank and to set the other tape in position to measure the distance between said datum means and the bottom of said body of liquid.

5. A liquid storage tank provided with a roof, two reels mounted on said roof, calibrated tapes attached to said reels and leading downwardly from the same into the tank, a datum means on the roof with which both of said tapes co-act, said tapes being arranged in close proximity to each other so that both of said tapes can be read at the same instant, a manually-operable means for actuating said reels to initially set said tapes in a certain relationship with the body of liquid stored in the tank, and an independent means for automatically actuating said reels to set said tapes in correct reading position, wherein the terminal portion of one tape is positioned at the surface of said liquid and the terminal portion of the other tape is positioned at the bottom of the body of liquid.

6. A liquid storage tank of the kind described in claim 4, in which one tape is provided with a device that is in just touching contact with the bottom of the tank when said tape is in correct reading position, and the other tape is provided with an element that is positioned at the surface of the liquid when said last mentioned tape is in correct reading position.

7. A liquid storage tank provided with a roof, a housing on said roof, provided with a sight opening, a datum means in the housing visible through said sight opening, two adjustable measuring elements in said housing adapted to extend downwardly from said datum means to the top surface and to the bottom of the body of liquid stored in the tank, both of said measuring elements being visible through said sight opening when said elements are functioning, a manually-operable means on the exterior of the housing for independently moving said measuring elements into position to co-act with the liquid stored in the tank, and means operable from the exterior of the housing for simultaneously clamping both measuring elements after they have been set in reading position.

8. A structure of the kind described in claim 7, which also includes a mechanism for automatically setting the measuring elements in position to measure the distance from the datum point to the bottom of the tank and the distance from said datum point to the surface of the liquid in the tank.

9. A liquid storage tank provided with a roof, two reels on said roof arranged parallel in close proximity to each other, a tape attached to one of said reels and provided at its end with a device that is adapted to be set in touching contact with the bottom of the tank, a tape attached to the other reel and provided at its end with a part that is adapted to be set in touching contact with the surface of the liquid in the tank, counterweights combined with said reels for turning them, independently of each other, to effect the correct setting of the tapes, and manually-operable actuating devices for said reels, capable of being coupled with or disconnected from said reels.

10. In a structure of the kind described in claim 9, a housing on the roof of the tank that encases said reels, a datum means in said housing with which both of the tapes co-act to simultaneously measure the distance between the datum point and the bottom of the tank and the distance between the datum point and the surface of the liquid, and means for holding said tapes in fixed relationship with said datum means after said tapes have been set by the action produced on the reels by the counterweights.

JOHN H. WIGGINS.